(12) United States Patent
Chen et al.

(10) Patent No.: US 11,762,396 B2
(45) Date of Patent: Sep. 19, 2023

(54) POSITIONING SYSTEM AND POSITIONING METHOD BASED ON WI-FI FINGERPRINTS

(71) Applicant: PSJ INTERNATIONAL LTD., Tortola (VG)

(72) Inventors: Chung-Yuan Chen, Tainan (TW); Alexander I Chi Lai, Taipei (TW); Ruey-Beei Wu, Taipei (TW)

(73) Assignee: PSJ INTERNATIONAL LTD., Tortola (VG)

( * ) Notice: Subject to any disclaimer, the term of this patent is extended or adjusted under 35 U.S.C. 154(b) by 219 days.

(21) Appl. No.: 17/138,808

(22) Filed: Dec. 30, 2020

(65) Prior Publication Data

US 2021/0274496 A1    Sep. 2, 2021

Related U.S. Application Data

(60) Provisional application No. 62/982,073, filed on Feb. 27, 2020.

(51) Int. Cl.
*G05D 1/02* (2020.01)
*H04W 84/18* (2009.01)
(Continued)

(52) U.S. Cl.
CPC ......... *G05D 1/0285* (2013.01); *G01C 21/005* (2013.01); *G01C 21/206* (2013.01);
(Continued)

(58) Field of Classification Search
None
See application file for complete search history.

(56) References Cited

U.S. PATENT DOCUMENTS

| | | | |
|---|---|---|---|
| 10,820,296 B2 * | 10/2020 | Zhang | H04W 24/10 |
| 2015/0237471 A1 * | 8/2015 | Li | H04W 4/021 |
| | | | 455/456.2 |

(Continued)

FOREIGN PATENT DOCUMENTS

| | | |
|---|---|---|
| CN | 102164405 A | 8/2011 |
| CN | 103402256 B | 1/2016 |
| CN | 106131958 A | 11/2016 |

*Primary Examiner* — Gregory B Sefcheck
*Assistant Examiner* — Suk Jin Kang
(74) *Attorney, Agent, or Firm* — Li & Cai Intellectual Property Office

(57) ABSTRACT

A positioning system and a positioning method based on WI-FI® fingerprints are provided. The method includes obtaining positioning map data; performing a clustering processing process to allocate collected data into reference groups in a target area according to collection coordinates; calculating metadata of WI-FI® access points; serving the metadata as a filtering condition related to an identification rate, and extracting WI-FI® fingerprint data with relatively high identification rate; establishing a machine learning model for estimating a relevant position based on the fingerprint data of the WI-FI® access points, and training the machine learning model with extracted WI-FI® fingerprint data and corresponding spatial coordinates to generate a trained machine learning model; configuring a communication module to receive WI-FI® fingerprint data collected by a wireless device; and configuring the trained machine learning model to estimate, according to the WI-FI® fingerprint data collected, the relevant position.

10 Claims, 12 Drawing Sheets

(51) Int. Cl.
　　*G06F 16/906*　　(2019.01)
　　*G06N 20/00*　　(2019.01)
　　*G06F 16/907*　　(2019.01)
　　*H04W 4/024*　　(2018.01)
　　*G01C 21/00*　　(2006.01)
　　*G01C 21/20*　　(2006.01)
　　*G01S 13/02*　　(2006.01)
　　*H04W 4/02*　　(2018.01)
　　*H04W 64/00*　　(2009.01)
　　*H04W 84/12*　　(2009.01)
　　*G06F 18/214*　　(2023.01)
　　*H04W 72/00*　　(2023.01)
　　*G06V 20/70*　　(2022.01)
　　*G06V 20/10*　　(2022.01)
　　*H04W 72/29*　　(2023.01)

(52) U.S. Cl.
　　CPC ........ *G01S 13/0209* (2013.01); *G05D 1/0248* (2013.01); *G05D 1/0257* (2013.01); *G05D 1/0282* (2013.01); *G06F 16/906* (2019.01); *G06F 16/907* (2019.01); *G06F 18/214* (2023.01); *G06N 20/00* (2019.01); *G06V 20/10* (2022.01); *G06V 20/70* (2022.01); *H04W 4/023* (2013.01); *H04W 4/024* (2018.02); *H04W 4/025* (2013.01); *H04W 64/003* (2013.01); *H04W 72/29* (2023.01); *H04W 84/12* (2013.01); *H04W 84/18* (2013.01)

(56) References Cited

U.S. PATENT DOCUMENTS

| | | | |
|---|---|---|---|
| 2015/0257014 A1* | 9/2015 | Ahmed | H04W 4/021 370/255 |
| 2016/0018507 A1* | 1/2016 | Chen | G01S 5/02524 455/456.2 |
| 2016/0337794 A1* | 11/2016 | Kim | H04W 4/023 |
| 2017/0251338 A1* | 8/2017 | Huberman | H04W 4/33 |
| 2017/0272181 A1* | 9/2017 | Gudi | G01S 5/02521 |
| 2017/0289768 A1* | 10/2017 | Wan | H04L 67/303 |
| 2017/0332203 A1* | 11/2017 | Nagpal | G01C 21/206 |
| 2018/0098196 A1* | 4/2018 | Dal Santo | H04W 64/006 |
| 2018/0109923 A1* | 4/2018 | Kim | H04W 4/023 |
| 2018/0184265 A1* | 6/2018 | Wan | H04L 67/303 |
| 2018/0279075 A1* | 9/2018 | Kusens | G01S 5/02529 |
| 2018/0295484 A1* | 10/2018 | Huberman | H04W 4/024 |
| 2018/0300977 A1* | 10/2018 | Kusens | G07C 9/27 |
| 2019/0383896 A1* | 12/2019 | Han | G01S 5/02525 |
| 2020/0241106 A1* | 7/2020 | Shu | G01S 5/0268 |
| 2021/0037498 A1* | 2/2021 | Soma | H04B 17/27 |
| 2021/0067914 A1* | 3/2021 | Butterwegge | G01S 5/0252 |
| 2021/0105578 A1* | 4/2021 | Chen | H04W 4/029 |
| 2021/0112427 A1* | 4/2021 | Shveki | G06F 3/011 |
| 2021/0256768 A1* | 8/2021 | Zhao | G06F 16/29 |
| 2022/0053285 A1* | 2/2022 | Shu | H04W 4/023 |
| 2022/0124597 A1* | 4/2022 | Yang | H04W 48/16 |
| 2022/0295233 A1* | 9/2022 | Chen | G06N 3/0454 |

* cited by examiner

POSITIONING SYSTEM AND POSITIONING METHOD BASED ON WI-FI FINGERPRINTS

CROSS-REFERENCE TO RELATED PATENT APPLICATION

This application claims priority to the U.S. Provisional Patent Application Ser. No. 62/982,073 filed on Feb. 27, 2020, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a positioning system and a positioning method, and more particularly to a positioning system and a positioning method based on WI-FI® fingerprints with high accuracy.

BACKGROUND OF THE DISCLOSURE

With an expansion of mobile computing nodes and advancement of wireless technology, there have been higher demands for accurate indoor positioning and related services. A reliable and accurate indoor positioning can support a wide range of applications.

However, current indoor positioning systems still have many issues to be addressed. For example, these systems are often imprecise, too complex to implement, and/or too expensive. Although an indoor positioning system based on WI-FI® and received signal strength indicator (RSSI) signals has a higher accuracy, the number of WI-FI® signals may be too large in the same field, resulting in high complexity and change rates. Therefore, it is difficult to establish an accurate positioning system purely based on WI-FI® signals and signal strengths.

Therefore, how a data set with a high identification rate for spatial location can be effectively extracted from a large and complex WI-FI® data set has become an important issue in the art.

SUMMARY OF THE DISCLOSURE

In response to the above-referenced technical inadequacies, the present disclosure provides a positioning system and a positioning method based on WI-FI® fingerprints with high accuracy.

In one aspect, the present disclosure provides a positioning method based on WI-FI® fingerprints, the positioning method implemented on at least one computing device, each of the computing devices includes at least one processor, a database, and a communication module, the positioning method includes: obtaining positioning map data of a target area from a database, in which the positioning map data includes a static map corresponding to the target area, coordinate axis information and a plurality of records of collected data, each of the plurality of records of collected data includes WI-FI® fingerprint data composed of a plurality of characteristic values of a plurality of WI-FI® access points and a corresponding collection coordinate; performing a clustering processing process to allocate the plurality of records of collected data into a plurality of reference groups in the target area according to the corresponding collection coordinates, in which each of the reference groups includes a portion of adjacent ones of the plurality of records of collected data, and an average coordinate of the collection coordinates corresponding to the portion of adjacent ones of the plurality of records of collected data is a reference group coordinate of the reference group; calculating, for a plurality of records of the fingerprint data in each of the plurality of reference groups in the plurality of records of collected data in the target, metadata of each of the WI-FI® access points, in which the metadata includes an attendance of the corresponding WI-FI® access point in all records of collected data, information entropy of the characteristic values of the corresponding WI-FI® access point, and a space-related information gain of the characteristic values of the corresponding WI-FI® access point; storing the plurality of records of the metadata of the WI-FI® access points in the database; serving the calculated metadata as a filtering condition related to an identification rate, and extracting WI-FI® fingerprint data with the relatively high identification rate; establishing a machine learning model for estimating a relevant position in the target area based on the fingerprint data of the WI-FI® access points, and training the machine learning model with the extracted WI-FI® fingerprint data and corresponding spatial coordinates to generate a trained machine learning model; configuring the communication module to receive WI-FI® fingerprint data collected by a wireless device at a current location of the wireless device in the target area; and configuring the trained machine learning model to estimate, according to the WI-FI® fingerprint data collected by the wireless device, the relevant position as the current location of the wireless device in the target area.

In some embodiments, the clustering processing process includes a density-based spatial clustering of applications with noise (DBSCAN).

In some embodiments, a step of calculating, for the plurality of records of the fingerprint data in each of the plurality of reference groups in the plurality of records of collected data in the target, metadata of each of the WI-FI® access points further includes: counting all the WI-FI® access points that have appeared but not repeated in the plurality of records of collected data and their attendances in the target area to generate a WI-FI® access point list, where each of records of the WI-FI® access point list has at least one characteristic value; calculating, for the characteristic value of each of the WI-FI® access points, a global distribution function in the plurality of records of collected data, and calculating a plurality of local distribution functions of the characteristic value respectively in the plurality of records of collected data that the plurality of reference groups belong to; calculating, for the characteristic value of each of the WI-FI® access points, a global information entropy and a plurality of local information entropies according to the corresponding global distribution function and the corresponding local distribution functions; and calculating, for the characteristic value of each of the WI-FI® access points, an information gain value according to an average value of the corresponding global distribution function and the corresponding local distribution functions, in which the information gain value represents an information amount related to space in the plurality of records of collected data related to the WI-FI® access point.

In some embodiments, a step of serving the calculated metadata as the filtering condition related to the identification rate further includes determining whether or not the metadata of the plurality of WI-FI® access points meet a predetermined condition, and if so, taking the characteristic values of the WI-FI® access points whose metadata meet the predetermined condition out from the plurality of records of fingerprint data to be reorganized as the WI-FI® fingerprint data with the relatively high identification rate.

In some embodiments, a step of training the machine learning model with the extracted WI-FI® fingerprint data and the corresponding spatial coordinates further includes: performing a multi-stage composite pre-processing on the extracted WI-FI® fingerprint data, in which the multi-stage composite pre-processing includes extreme value filtering, normalization, and sample number balancing; performing standardizing and sample number balancing for the corresponding spatial coordinates; dividing the WI-FI® fingerprint data processed by the multi-stage composite pre-processing and the corresponding spatial coordinates into a training set and a verification set in proportion, and training the machine learning model with the training set; and inputting the verification set into the machine learning model to evaluate whether or not the machine learning model passes a performance test, if not, adjusting a plurality of hyperparameters associated with the machine learning model and continuously training the machine learning model with the training set until the machine learning model passes the performance test, and the machine learning model that has passed the performance test will be used as the trained machine learning model, in which the plurality of hyperparameters include learning rates, noise intensities, and correlation coefficients of a gradient optimization model.

In another aspect, the present disclosure provides a positioning system based on WI-FI® fingerprints, the positioning system includes a wireless device and a computing device. The wireless device is configured to collect WI-FI® fingerprint data at a current location where the wireless device is located in a target area. The computing device includes a processor, a database, and a communication module. The database stores positioning map data of a target area, the positioning map data includes a static map corresponding to the target area, coordinate axis information and a plurality of records of collected data, and each of the plurality of records of collected data includes WI-FI® fingerprint data composed of a plurality of characteristic values of a plurality of WI-FI® access points and a corresponding collection coordinate. A trained machine learning model is generated by the processor executing the following steps, including: obtaining the positioning map data of the target area from the database; performing a clustering processing process to allocate the plurality of records of collected data into a plurality of reference groups in the target area according to the corresponding collection coordinates; calculating, for a plurality of records of the fingerprint data in each of the plurality of reference groups in the plurality of records of collected data in the target, metadata of each of the WI-FI® access points, wherein the metadata includes an attendance of the corresponding WI-FI® access point in all of the plurality of records of collected data, information entropy of the characteristic values of the corresponding WI-FI® access point, and a space-related information gain of the characteristic values of the corresponding WI-FI® access point; storing the plurality of records of the metadata of the WI-FI® access points in the database; serving the calculated metadata as a filtering condition related to an identification rate, and extracting WI-FI® fingerprint data with the relatively high identification rate; and establishing a machine learning model for estimating a relevant position in the target area based on the fingerprint data of the WI-FI® access points, and training the machine learning model with the extracted WI-FI® fingerprint data and corresponding spatial coordinates to generate a trained machine learning model. The communication module is configured to receive the collected WI-FI® fingerprint data from the wireless device. The processor is configured to estimate, according to the WI-FI® fingerprint data collected by the wireless device, the relevant position as the current location of the wireless device in the target area by the trained machine learning model.

Therefore, the positioning system and method based on the WI-FI® fingerprints provided by the present disclosure can cluster WI-FI® fingerprint data according to their spatial coordinates through a clustering algorithm, and calculate the metadata of each of the WI-FI® access points to obtain the information gain corresponding to each characteristic value of each WI-FI® access point, select the characteristic value of the WI-FI® access point with a relatively high identification rate, and use a machine learning manner to establish a positioning model. After training and testing are performed, the positioning model can be used to estimate a spatial location corresponding to WI-FI® fingerprint data. In addition, experimental verification shows that the characteristic values of WI-FI® access points filtered based on information gain have higher accuracy for spatial positioning.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
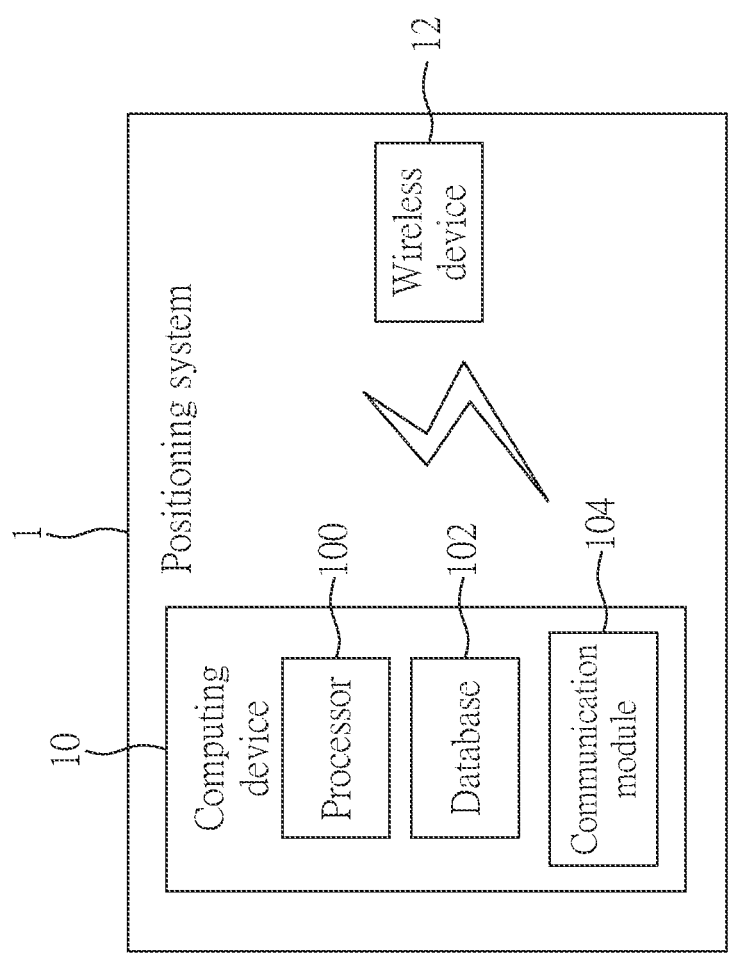
FIG. 1 is a block diagram of a positioning system based on WI-FI® fingerprints according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

FIG. 1 is a block diagram of a positioning system based on WI-FI® fingerprints according to an embodiment of the present disclosure. Reference is made to FIG. 1, a first embodiment of the present disclosure provides a positioning system 1 based on WI-FI® fingerprints, the positioning system 1 includes a wireless device 12 and a computing device 10. In detail, the wireless device 12 is configured to collect WI-FI® fingerprint data at a current location where the wireless device 12 is located in a target area. The wireless device 12 can include a wireless transceiver to receive and transmit signals, and the wireless device 12 can be, for example, a mobile device such as a tablet computer, a mobile phone, or a proprietary hardware platform. In detail, the wireless device 12 is mainly configured to utilize a detected number of WI-FI® access points, basic service set IDs (BSSIDs) of detectable WI-FI access points signal strength indicators (RSSIs) of detectable WI-FI® access points, channel information of detectable WI-FI® access points, characteristic information generated during a communication process with the detected WI-FI® access point, to generate WI-FI® fingerprints. However, not all embodiments are limited to the above fingerprint technology, and other WI-FI® location technologies can also be used to simultaneously mix data from various radio sources, such as combined WI-FI®, radio frequency identification (RFID), wireless BLUETOOTH® transmission of data, or ultra-wideband (UWB) ranging module, and non-wireless RF signal data can also be combined, such as signal date from inertial measurement unit and environmental measurement unit. In some embodiments, the wireless device 12 can include a processing unit (for example, a processor), a storage unit (for example, flash memory) and a transceiver unit (for example, a WI-FI® module supporting 2.4G/5G frequency band) electrically connected to the processing unit.

The computing device 10 includes a processor 100, a database 102 and a communication module 104. The computing device 10 can include any suitable processor-driven computing device, including but not limited to desktop computing devices, laptop computing devices, servers, smart phones, tablet computers, and the like. The processor 100 can be an integrated circuit such as a programmable logic controller circuit, a micro-processor circuit, or a micro-control circuit, or an electronic device including the aforementioned integrated circuit, such as tablet computer, mobile phone, notebook computer or desktop computer, but the present disclosure is not limited thereto.

Figure 2:
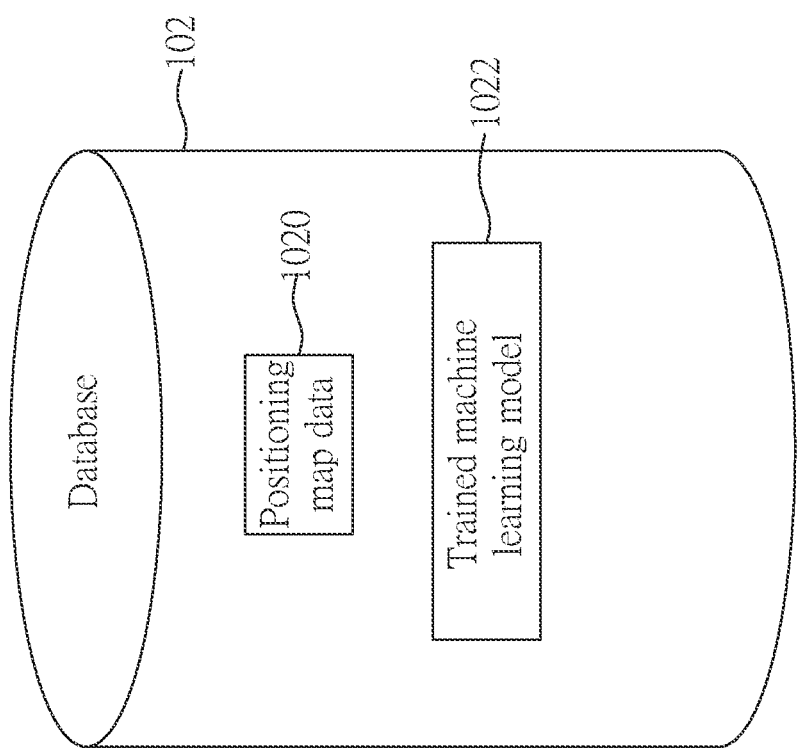
FIG. 2 is a schematic diagram of a database according to an embodiment of the present disclosure.
Figure 3:
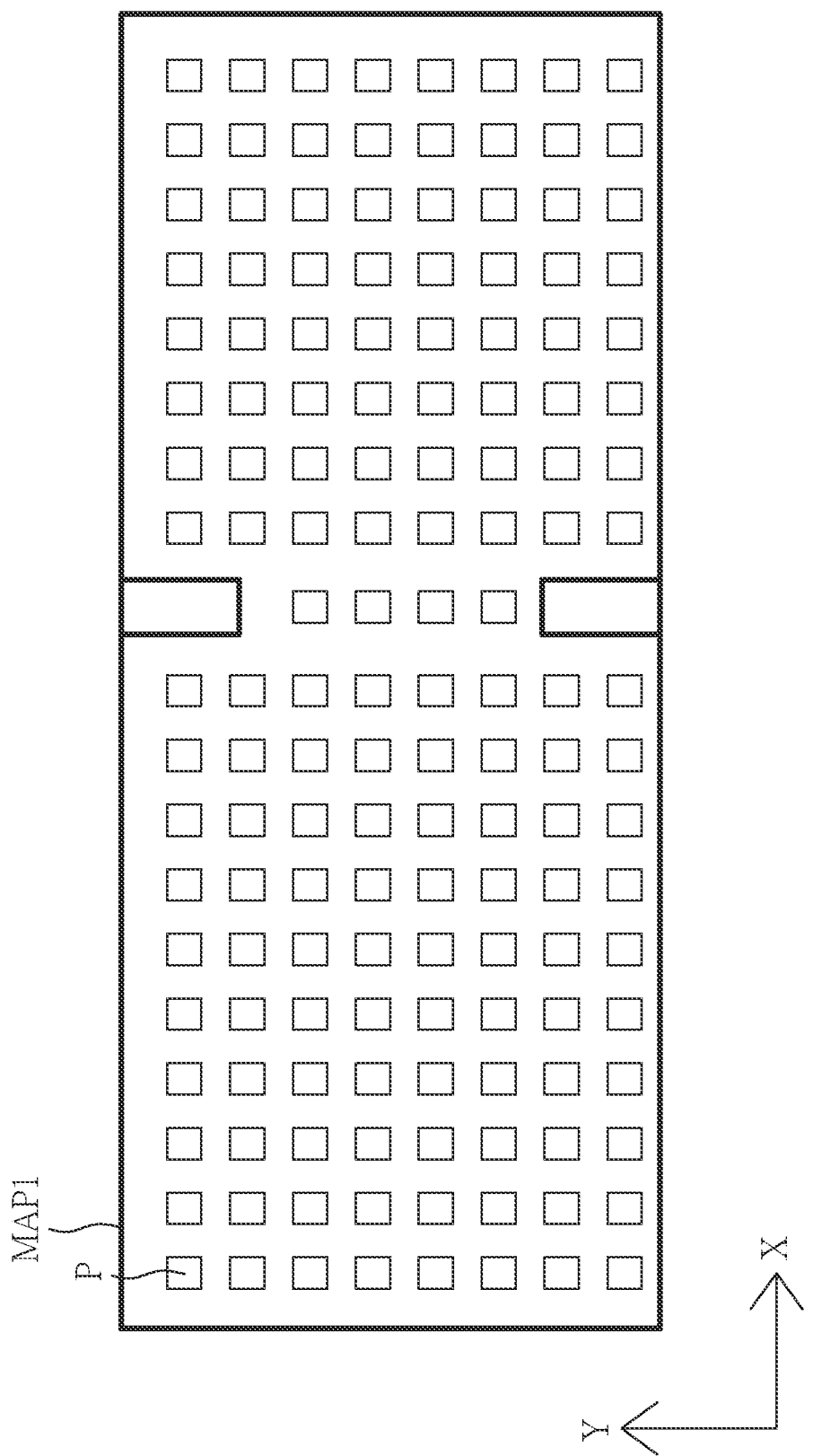
FIG. 3 is a schematic diagram of a target area and multiple collection points according to an embodiment of the present disclosure.

Reference can be further made to FIGS. 2 and 3, FIG. 2 is a schematic diagram of a database according to an embodiment of the present disclosure, and FIG. 3 is a schematic diagram of a target area and multiple collection points according to an embodiment of the present disclosure. As shown in FIG. 2, the database 102 stores positioning map data 1020 of a target area and a trained machine learning model 1022, in which the positioning map data 1020 includes a static map corresponding to the target area, coordinate axis information, and a plurality of records of collected data, and each of the plurality of records of collected data includes WI-FI® fingerprint data and a corresponding collection coordinate. The WI-FI® fingerprint data can be collected from a plurality of target collection points in the target area. The database 102 can be, for example, a memory system, which can include non-volatile memory (such as flash memory) and system memory (such as DRAM), and supporting database management software and systems.

More specifically, as shown in FIG. 3, a target area MAP1 can be an indoor place or building that is predetermined to perform positioning, the positioning map data 1020 can include one or more maps of each floor of the place or building mentioned above. The plurality of target collection points P can be multiple coordinates scattered on the target area map MAP1, and the plurality of records of WI-FI® fingerprint data can be, for example, WI-FI® fingerprint data obtained by the user in advance from the target collection points in the target area, and can include WI-FI® fingerprint data detected by a wireless receiver at each of the plurality of target collection points.

WI-FI® fingerprint data can be of multiple types, and any feature with unique location can be used as one record of WI-FI® fingerprint data. For example, multipath structure of the WI-FI® signal at a certain location, whether an access point (AP) or base station can be detected at a certain location, a received signal strength (RSS) from an access point can be detected at a certain location, and a round-trip time or delay of a signal when communicating via WI-FI® at a certain location, these can be used as one record of WI-FI® fingerprint data, or the above features can be combined as one record of WI-FI® fingerprint data. In other words, one record of the WI-FI® fingerprint data can be composed of a plurality of characteristic values of a plurality of WI-FI® access points.

In detail, although an indoor positioning system based on WI-FI® and received signal strength indicator (RSSI) signals has a higher accuracy, the number of WI-FI® signals may be too large in the same field, resulting in high complexity and change rates. Therefore, it is difficult to establish an accurate positioning system purely based on WI-FI® signals and strengths. Thus, the present disclosure further extracts a data set with a high identification rate for spatial locations from a WI-FI® data set.

Figure 4:
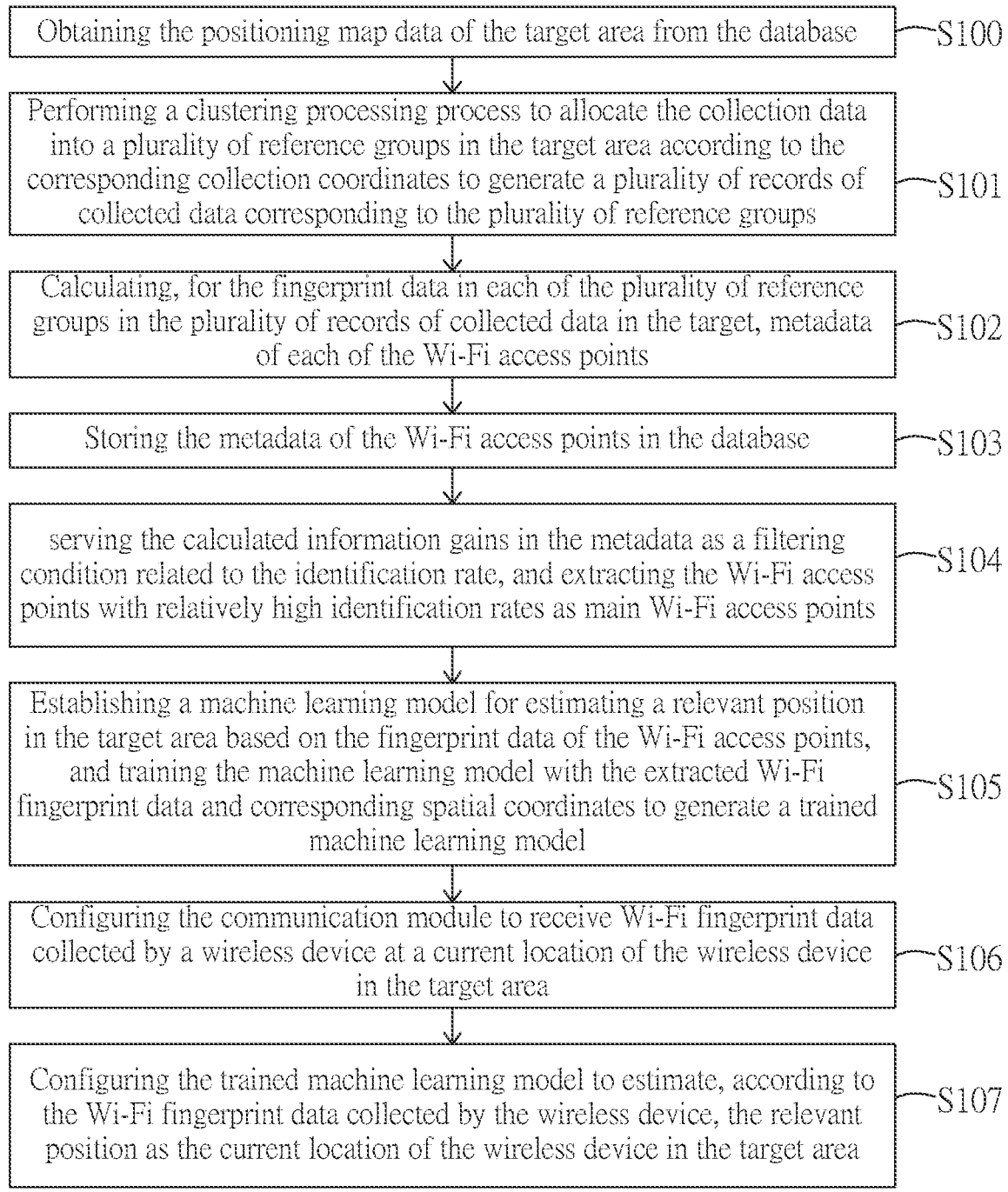
FIG. 4 is a flowchart of a positioning method based on WI-FI® fingerprints according to an embodiment of the present disclosure.

Reference is made to FIG. 4, which is a flowchart of a positioning method based on WI-FI® fingerprints according to an embodiment of the present disclosure. As shown in FIG. 4, a positioning method based on WI-FI® fingerprints is applicable to the positioning system described in the foregoing embodiment, but the present disclosure is not limited thereto. The positioning method can be implemented on any computing device including a processor and a database, and can include the following steps:

Step S100: Obtaining the positioning map data of the target area from the database. As mentioned above, the positioning map data includes a plurality of records of WI-FI® fingerprint data corresponding to the plurality of target collection points in the target area. For example, the original collected data can be divided and stored in the database according to the collection date. The processor can execute a data import program to read the original collected data and perform data integrity checking process, then the plurality of records of collected data are added in a non-relational database of the corresponding building and floor according to a specific file format, and information of this import operation will also be recorded in the database.

Step S101: Performing a clustering processing process to allocate the plurality of records of collected data into a plurality of reference groups in the target area according to the corresponding collection coordinates to generate a plurality of records of collected data corresponding to the plurality of reference groups.

Figure 5:
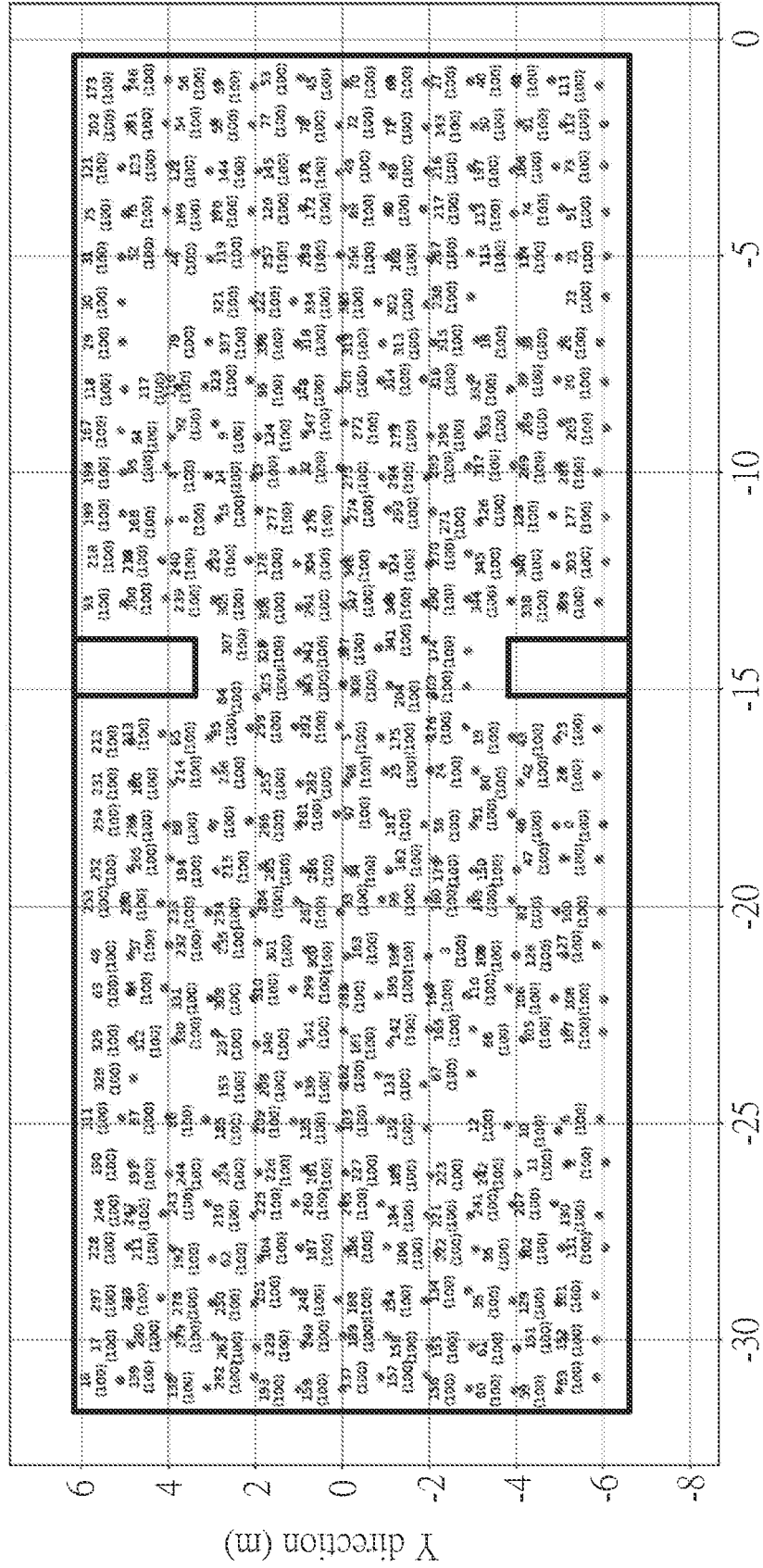
FIG. 5 is a coordinate diagram showing a clustering result obtained by executing DBSCAN according to an embodiment of the present disclosure.

For example, the so-called clustering algorithm can be, for example, a density-based spatial clustering of applications with noise (DBSCAN). By executing DBSCAN, the plurality of records of collected data are allocated to the plurality of reference groups in the target area according to the collection coordinates of the plurality of records of collected data in the target area, and each reference group includes a plurality of adjacent records of collected data. In this step, all collected data in the target area are divided into different groups based on spatial information, so as to analyze correlation between the WI-FI® fingerprint data in the plurality of records of collected data and the corresponding collection coordinates later. For example, reference can be made to FIG. 5, which is a coordinate diagram showing a clustering result obtained by executing DBSCAN according to an embodiment of the present disclosure. As shown in FIG. 5, each reference point obtained by DBSCAN has its own coordinate and corresponding number, and the number of data indicated by parentheses under the number is as shown in FIG. 5. By executing DBSCAN, several records of the plurality of records of collected data included in each reference group form a cluster, which can be regarded as distribution state of a high-dimensional feature vector at a specific spatial position.

Step S102: Calculating, for the plurality of records of the fingerprint data in each of the plurality of reference groups in the plurality of records of collected data in the target, metadata of each of the WI-FI® access points. In detail, the metadata can include an attendance of the corresponding WI-FI® access points, information entropy of the characteristic value distribution, and a space-related information gain of the characteristic values of the corresponding WI-FI® access point.

Figure 6:
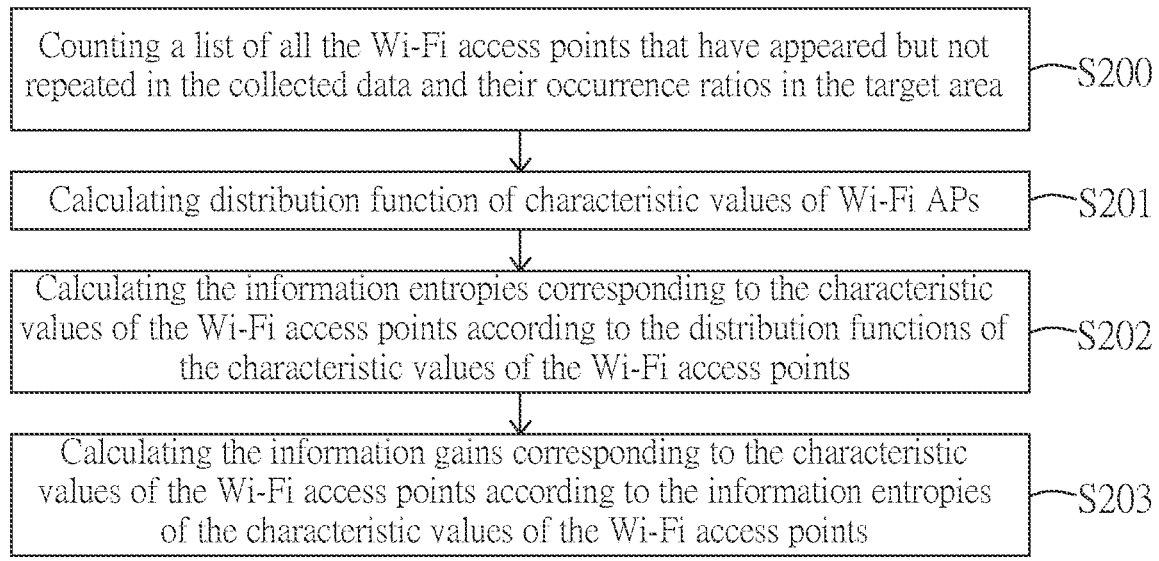
FIG. 6 is a flowchart of a metadata calculation according to an embodiment of the present disclosure.

Here, reference can be further made to FIG. 6, which is a flowchart of metadata calculation according to an embodiment of the present disclosure.

Step S200: Counting a list of all the WI-FI® access points that have appeared but not repeated in the plurality of records of collected data and their attendances in the target area. Each WI-FI® access point in the above list of WI-FI® access points has at least one characteristic value. These characteristic values can be, but are not limited to, received signal strength indicator (RSSI) or measurable values such as round trip time (RTT) based on 802.11mc specification.

Step S201: Calculating a distribution function of the characteristic values of the WI-FI® access points. The distribution function p describes a corresponding relationship between a specific event X=x (indicating that a numerical variable X conforms to a specific value x) and an occurrence probability P (X=x) of the event. Moreover, information amount I contained in the specific event x that occurs with a certain probability p(x) can be expressed by the following equation (1):

$$\text{Distribution function } p{:}p_X(x){=}P(X{=}x).$$

The information amount I contained in the event:

$$I(X{=}x){=}{-}\log(p_X(x)) \qquad \text{Equation (1).}$$

Figure 7:
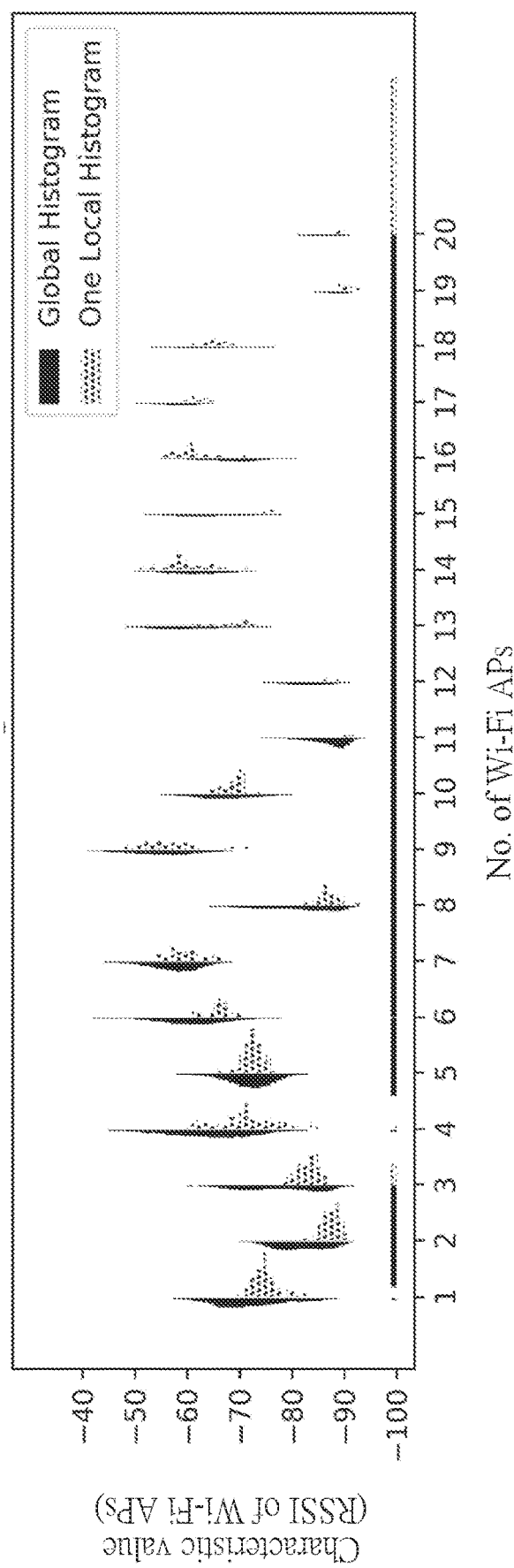
FIG. 7 shows a global value distribution state diagram (Global Histogram) and a single local value distribution state diagram (One Local Histogram) represented by histograms according to an embodiment of the present disclosure.

According to different limitation conditions of a population range of the calculated distribution function, which can be divided into the following two types:

The first type is a global distribution function that takes a plurality of records of fingerprint data of the target area as a statistical population without limiting the reference group, and results can be seen in FIG. 7, which shows a global value distribution state diagram (Global Histogram) and a single local value distribution state diagram (One Local Histogram) represented by histograms according to an embodiment of the present disclosure.

The second type is a local distribution function that limitedly takes a plurality of records of collected data belonging to a specific reference group as the statistical population, and the result can be seen in the single local value distribution state diagram of FIG. 7. Since there is a plurality of reference groups in the target area, the characteristic value of each WI-FI® access point has a plurality of local distribution functions.

Figure 8:
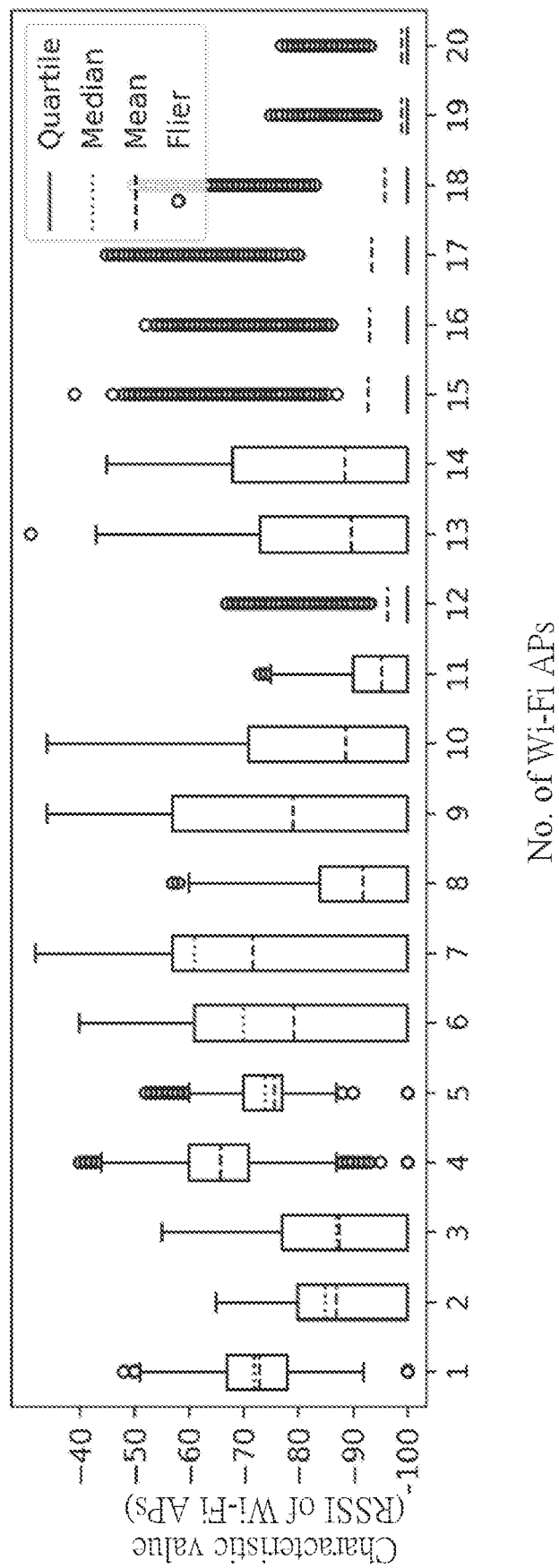
FIG. 8 is a box plot of the global value distribution state of characteristic values according to an embodiment of the present disclosure.

On the other hand, reference can be made in conjunction with FIG. 8, which is a box plot of the global value distribution state of characteristic values according to an embodiment of the present disclosure. In FIGS. 7 and 8, a horizontal axis is the number of the WI-FI® access point, and a vertical axis is magnitude of the characteristic value of the WI-FI® access point. This embodiment shows measurement values of received signal strength indicators (RSSIs). FIG. 8 further shows median, average and outlier values of these characteristic values. According to the results of the embodiment of the present disclosure, it can be observed that a fingerprint model based on basic statistical methods such as the average value is not sufficient to represent a distribution mode of the feature values.

Step S201: calculating the information entropies corresponding to the characteristic values of the WI-FI® access points according to the distribution functions of the characteristic values of the WI-FI® access points. One global information entropy and a plurality of local information entropies can be calculated for each of the characteristic values. The difference between global entropy and local entropy lies in the different statistical population ranges of the distribution function used to calculate the information entropy. The global entropy is obtained from numerical distribution function (global distribution function) of all samples of the feature in the target area. Conversely, the local entropy is obtained from the distribution function (local distribution function) of the sample in a single reference group. Therefore, a plurality of reference groups in a target area corresponds to a plurality of local distribution functions and a plurality of local entropies. Calculation of information entropy can be expressed by the following equation (2):

$$H(X)=E_{x \in X}[I(X=x)]=\Sigma_{x \in X} -p_X(x)\log(p_X(x)) \qquad \text{Equation (2).}$$

Step S203: calculating the information gains corresponding to the characteristic values of the WI-FI® access points according to the information entropies of the characteristic values of the WI-FI® access points. Calculation method of the information gain can be expressed by the following equation (3):

$$IG(X_j,R)=H(X_j)-\Sigma_{r \in R} p_R(r) \cdot H(X_j|r) \qquad \text{Equation (3).}$$

Figure 9:
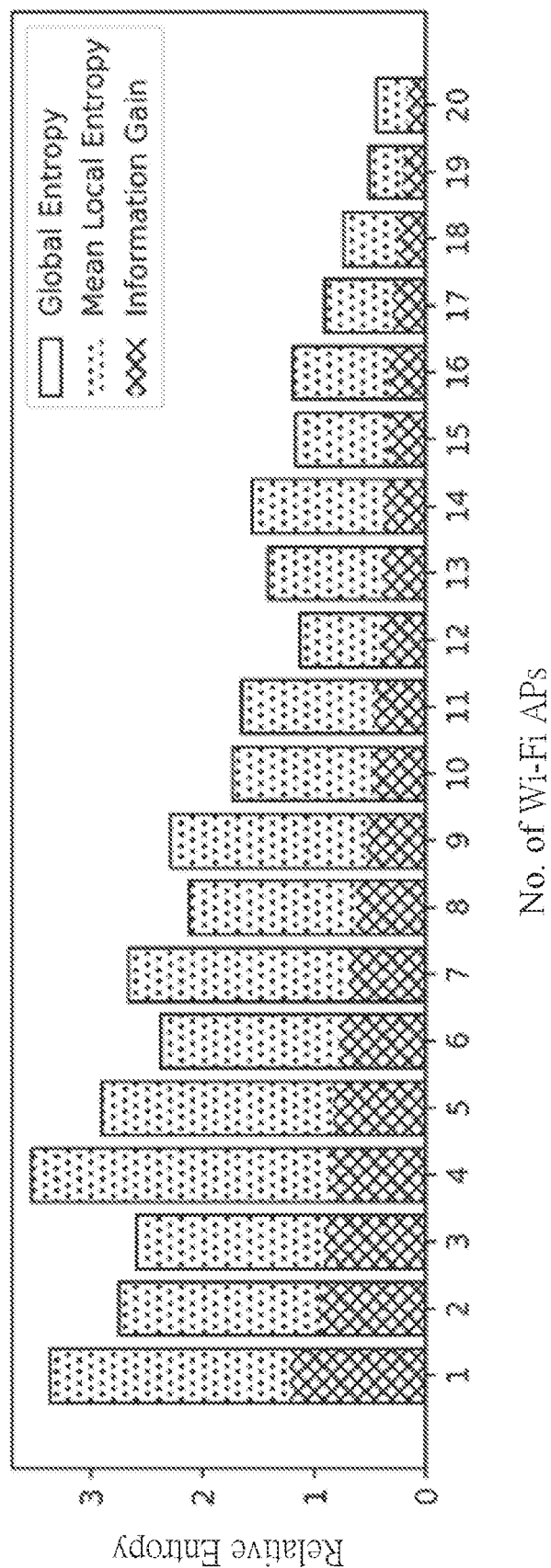
FIG. 9 is a graph of information entropy and information gain according to an embodiment of the present disclosure.

The calculated information entropies and information gains can be represented by FIG. 9, which is a graph of information entropy and information gain according to an embodiment of the present disclosure. A horizontal axis is the number of the WI-FI® access point, and a vertical axis is relative magnitude of the information entropy of the corresponding characteristic value. The information entropies include global entropy, mean local entropy, and information gain. The combination of the three is presented in a stacked histogram, that is, the information gain is a difference between the global entropy and the mean local entropy.

Figure 10:
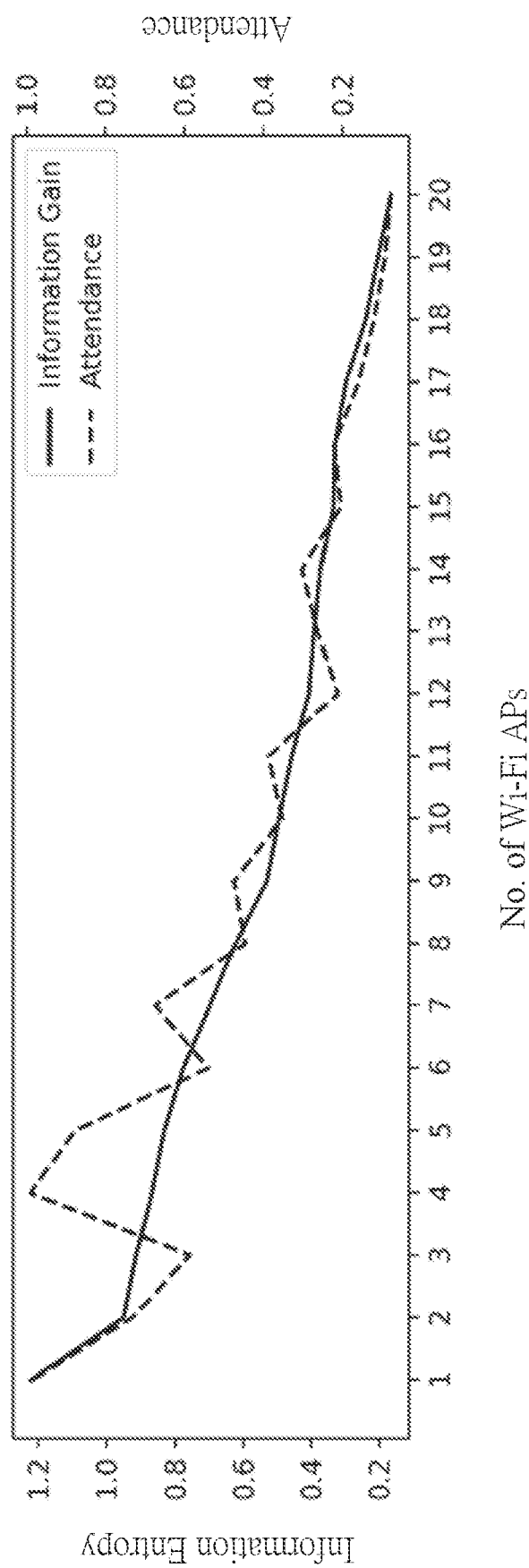
FIG. 10 shows a relative numerical relationship between the information gain and attendance corresponding to WI-FI® access points according to an embodiment of the present disclosure.

In addition, FIG. 10 presents relative numerical relationship between information gains and attendances corresponding to the WI-FI® access points. FIG. 10 shows that the information gains and the attendances tend to be close on a large scale, but there are still exchange relations in local relative order. According to the Information theory, the WI-FI® access points with higher information gain have a higher identification rate for spatial positioning.

Figure 11:
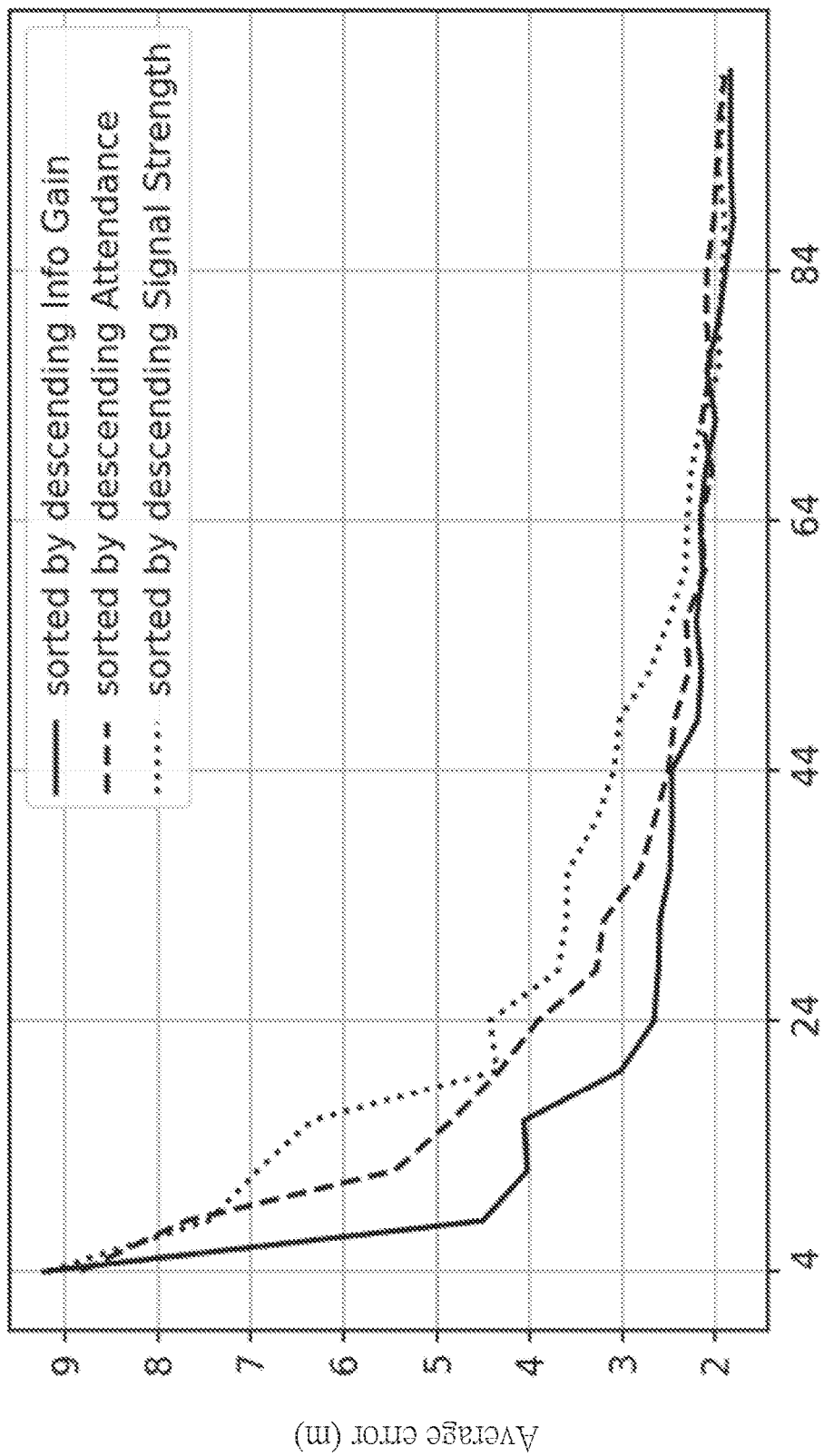
FIG. 11 is an experimental result for a positioning model according to an embodiment of the present disclosure.

To verify this feature, an experiment is performed to select same numbers of records of collected data of the WI-FI® access points in a decreasing order from the largest according to their information gains, attendances, and signal strengths, and the selected records of collected data are used as a data set for training and testing the positioning model in the next step. Reference is further made to FIG. 11, which is an experimental result for a positioning model according to an embodiment of the present disclosure. It can be seen from FIG. 11 that the positioning model made by selecting the same number of WI-FI® access points in the decreasing order from the maximum information gain value has a lower positioning error and a faster training convergence speed. Therefore, the present disclosure proposes to use the information gain value as one of the methods for evaluating the identification rate of the WI-FI® access points.

Returning to the positioning method based on WI-FI® fingerprints of the present disclosure, the positioning method proceeds to step S103: storing the metadata of the WI-FI® access points in the database.

Step S104: serving the calculated information gains in the metadata as a filtering condition related to the identification rate, and extracting the WI-FI® access points with relatively high identification rates as main WI-FI® access points. From the foregoing steps, it can be seen that since high accuracy can be achieved by using the information gains as determination conditions for spatial positioning, the information gains can be used as the filtering condition and sorting condition related to the identification rate. For example, a predetermined gain range can be set for determining whether the metadata of the WI-FI® access points meet the predetermined conditions, and if so, the characteristic values of the WI-FI® access points whose metadata meet the predetermined condition are taken out from all records of fingerprint data, and reorganized as the WI-FI® fingerprint data with the relatively high identification rate. On the other hand, in other embodiments, the predetermined condition can also be, for example, determining whether or not the attendances of the WI-FI® access points are sufficiently high.

Step S105: Establishing a machine learning model for estimating a relevant position in the target area based on the fingerprint data of the WI-FI® access points, and training the machine learning model with the extracted WI-FI® fingerprint data and corresponding spatial coordinates to generate a trained machine learning model.

Figure 12:
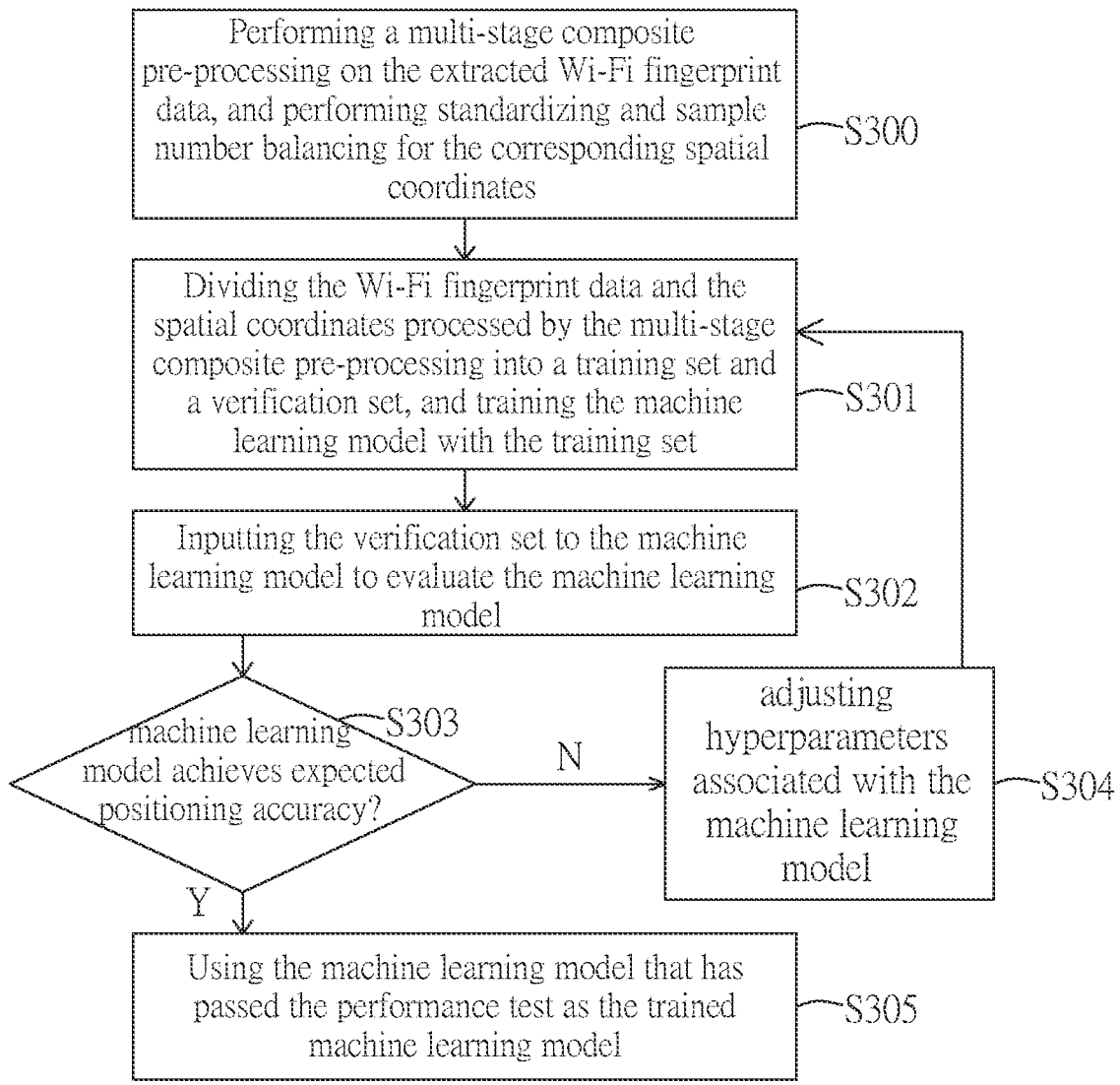
FIG. 12 is a flowchart of a method for training a machine learning model according to an embodiment of the present disclosure.

In detail, it is relatively inaccurate to perform the positioning only by numerical comparison. Therefore, the present disclosure utilizes a machine learning method to establish a regression model, which can be used to infer spatial locations of WI-FI® fingerprint samples after training and testing. Reference is made to FIG. 12, which is a flowchart of a method for training a machine learning model according to an embodiment of the present disclosure.

Step S300: Performing a multi-stage composite pre-processing on the extracted WI-FI® fingerprint data, and performing standardizing and sample number balancing for the corresponding spatial coordinates. The multi-stage composite pre-processing can include extreme value filtering, normalization, and sample number balancing.

Step S301: Dividing the WI-FI® fingerprint data and the spatial coordinates processed by the multi-stage composite pre-processing into a training set and a verification set, and training the machine learning model with the training set. The fingerprint data and the spatial coordinates can be divided into the training set and the verification set according to proper proportion and random order.

Step S302: Inputting the verification set to the machine learning model to evaluate the machine learning model.

Step S303: Evaluating whether or not the machine learning model achieves an expected positioning accuracy, if not, adjusting hyperparameters associated with the machine learning model and returning back to step S301 to continuously train the machine learning model with the training set until the machine learning model passes the performance test, and then proceeding to step S305 of the position method: using the machine learning model that has passed the performance test as the trained machine learning model. If the machine learning model fails to achieve the expected positioning accuracy after multiple times of iterations of adjustment, trainings, and evaluations, the system will issue a warning to an administrator of the machine learning model, which indicates that the training data has quality defects or other exceptions. In this embodiment, adjusting the hyperparameters may include adjusting the learning rate, noise intensity, and correlation coefficients of the gradient optimization model.

The trained machine learning model is verified and evaluated, and then finally exported as a binary file, which can be registered as a valid positioning model in the computing device 10. The exported binary file of the trained machine learning model can be uploaded to a specific positioning server to connect with the wireless device 12. The positioning server can further package the trained machine learning model into a container image and deploy it to provide positioning services for the wireless device 12. In this case, a representational state transfer (RESTful) application program interface (API) can be used to deploy the container image to provide positioning services for the wireless device 12.

Next, returning to the positioning method based on WI-FI® fingerprints of the present disclosure, step S106 of the positioning method is performed: configuring the communication module to receive WI-FI® fingerprint data collected by a wireless device at a current location of the wireless device in the target area.

Step S107: Configuring the trained machine learning model to estimate, according to the WI-FI® fingerprint data collected by the wireless device, the relevant position as the current location of the wireless device in the target area.

In conclusion, the positioning system and method based on the WI-FI® fingerprints provided by the present disclosure can cluster WI-FI® fingerprint data according to their spatial coordinates through a clustering algorithm, and calculate the metadata of each of the WI-FI® access points to obtain the information gain corresponding to each characteristic value of each WI-FI® access point, select the characteristic value of the WI-FI® access point with a relatively high identification rate, and use machine learning to establish a positioning model. After training and testing are performed, the positioning model can be used to estimate a spatial location corresponding to WI-FI® fingerprint data. In addition, experimental verification shows that the WI-FI® access points filtered based on information gain have higher accuracy for spatial positioning.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A positioning method based on Wi-Fi fingerprints, the positioning method implemented on at least one computing device, each of the computing devices including at least one processor, a database, and a communication module, and the positioning method comprising:
   obtaining a positioning map data of a target area from the database, wherein the positioning map data includes a static map corresponding to the target area, a coordinate axis information and a plurality of records of collected data, each of the plurality of records of collected data includes Wi-Fi fingerprint data having a plurality of characteristic values of a plurality of Wi-Fi access points and a corresponding collection coordinate;
   performing a clustering processing process to allocate the plurality of records of collected data into a plurality of reference groups in the target area according to the corresponding collection coordinates, wherein each of the reference groups includes a portion of adjacent ones of the plurality of records of collected data, and an average coordinate of the collection coordinates corresponding to the portion of adjacent ones of the plurality of records of collected data is a reference group coordinate of the reference groups;
   calculating, for a plurality of records of the Wi-Fi fingerprint data in each of the plurality of reference groups in the plurality of records of collected data in the target area, metadata of each of the Wi-Fi access points, wherein the metadata includes an attendance of the corresponding Wi-Fi access points in all records of the plurality of records of collected data, information entropy of the characteristic values of the corresponding Wi-Fi access points, and a space-related information gain of the characteristic values of the corresponding Wi-Fi access points;
   storing the metadata of the Wi-Fi access points in the database;
   serving the calculated metadata of the Wi-Fi access points as a filtering condition related to an identification rate, and extracting Wi-Fi fingerprint data with a relatively high identification rate;
   establishing a machine learning model for estimating a relevant position in the target area based on the Wi-Fi fingerprint data of the Wi-Fi access points, and training the machine learning model with the extracted Wi-Fi fingerprint data having the relatively high identification rate and corresponding spatial coordinates to generate a trained machine learning model;
   configuring the communication module to receive the Wi-Fi fingerprint data collected by a wireless device at a current location of the wireless device in the target area; and
   configuring the trained machine learning model to estimate, according to the Wi-Fi fingerprint data collected by the wireless device, the relevant position as the current location of the wireless device in the target area.

2. The positioning method according to claim 1, wherein the clustering processing process includes a density-based spatial clustering of applications with noise (DBSCAN).

3. The positioning method according to claim 1, wherein a step of calculating, for the plurality of records of the fingerprint data in each of the plurality of reference groups in the plurality of records of collected data in the target area, the metadata of each of the Wi-Fi access points further includes:
   counting all the Wi-Fi access points that have appeared but not repeated in the plurality of records of collected data and their attendances in the target area to generate a Wi-Fi access points list, wherein each record of the Wi-Fi access points list has at least one characteristic value;
   calculating, for the characteristic value of each of the Wi-Fi access points, a global distribution function in the plurality of records of collected data, and calculating a plurality of local distribution functions of the characteristic value respectively in the plurality of records of collected data that the plurality of reference groups belong to;
   calculating, for the characteristic value of each of the Wi-Fi access points, a global information entropy and a plurality of local information entropies according to the corresponding global distribution function and the corresponding local distribution functions; and calculating, for the characteristic value of each of the Wi-Fi access points, an information gain value according to an average value of the corresponding global distribution function and the corresponding local distribution functions, wherein the information gain value represents an information amount related to space in the plurality of records of collected data related to the Wi-Fi access points.

4. The positioning method according to claim 1, wherein a step of serving the calculated metadata as the filtering condition related to the identification rate further includes determining whether or not the metadata of the plurality of Wi-Fi access points meet a predetermined condition, and if the predetermined condition is met, taking the characteristic values of the Wi-Fi access points whose metadata meet the predetermined condition out from the plurality of records of fingerprint data to be reorganized as the Wi-Fi fingerprint data with the relatively high identification rate.

5. The positioning method according to claim 1, wherein a step of training the machine learning model with the extracted Wi-Fi fingerprint data having the relatively high identification rate and the corresponding spatial coordinates further includes:
performing a multi-stage composite pre-processing on the extracted Wi-Fi fingerprint data having the relatively high identification rate, wherein the multi-stage composite pre-processing includes extreme value filtering, normalization, and sample number balancing;
performing standardizing and the sample number balancing for the corresponding spatial coordinates;
dividing the Wi-Fi fingerprint data processed by the multi-stage composite pre-processing and the corresponding spatial coordinates into a training set and a verification set in proportion, and training the machine learning model with the training set; and
inputting the verification set into the machine learning model to evaluate whether or not the machine learning model passes a performance test, if not, adjusting a plurality of hyperparameters associated with the machine learning model and continuously training the machine learning model with the training set until the machine learning model passes the performance test, and using the machine learning model that has passed the performance test as the trained machine learning model,
wherein the plurality of hyperparameters include learning rates, noise intensities, and correlation coefficients of a gradient optimization model.

6. A positioning system based on Wi-Fi fingerprints, comprising:
a wireless device configured to collect Wi-Fi fingerprint data at a current location where the wireless device is located in a target area; and
a computing device, including:
a processor;
a database storing positioning map data of a target area, wherein the positioning map data includes a static map corresponding to the target area, coordinate axis information and a plurality of records of collected data, each of the plurality of records of collected data includes Wi-Fi fingerprint data having a plurality of characteristic values of a plurality of Wi-Fi access points and a corresponding collection coordinate; and
a communication module,
wherein a trained machine learning model is generated by the processor executing the following steps, including:

obtaining the positioning map data of the target area from the database;
performing a clustering processing process to allocate the plurality of records of collected data into a plurality of reference groups in the target area according to the corresponding collection coordinates, wherein each of the reference groups includes a portion of adjacent ones of the plurality of records of collected data, and an average coordinate of the collection coordinates corresponding to the portion of adjacent ones of the plurality of records of collected data is a reference group coordinate of the reference group;
calculating, for a plurality of records of the fingerprint data in each of the plurality of reference groups in the plurality of records of collected data in the target area, metadata of each of the Wi-Fi access points, wherein the metadata includes an attendance of the corresponding Wi-Fi access points in all records of the plurality of records of collected data, information entropy of the characteristic values of the corresponding Wi-Fi access points, and a space-related information gain of the characteristic values of the corresponding Wi-Fi access points;
storing the metadata of the Wi-Fi access points in the database;
serving the calculated metadata of the Wi-Fi access points as a filtering condition related to an identification rate, and extracting Wi-Fi fingerprint data with a relatively high identification rate; and
establishing a machine learning model for estimating a relevant position in the target area based on the fingerprint data of the Wi-Fi access points, and training the machine learning model with the extracted Wi-Fi fingerprint data having the relatively high identification rate and corresponding spatial coordinates to generate the trained machine learning model;
wherein the communication module is configured to receive the collected Wi-Fi fingerprint data from the wireless device; and
wherein the processor is configured to estimate, according to the Wi-Fi fingerprint data collected by the wireless device, the relevant position as the current location where the wireless device is located in the target area by the trained machine learning model.

7. The positioning system according to claim 6, wherein the clustering processing process includes a density-based spatial clustering of applications with noise (DBSCAN).

8. The positioning system according to claim 6, wherein a step that the processor is configured to calculate, for the plurality of records of the fingerprint data in each of the plurality of reference groups in the plurality of records of collected data in the target area, the metadata of each of the Wi-Fi access points further includes:
counting all the Wi-Fi access points that have appeared but not repeated in the plurality of records of collected data and their attendances in the target area to generate a Wi-Fi access points list, wherein each record of the Wi-Fi access points list has at least one characteristic value;
calculating, for the characteristic value of each of the Wi-Fi access points, a global distribution function in the plurality of records of collected data, and calculating a plurality of local distribution functions of the characteristic value respectively in the plurality of records of collected data that the plurality of reference groups belong to;

calculating, for the characteristic value of each of the Wi-Fi access points, a global information entropy and a plurality of local information entropies according to the corresponding global distribution function and the corresponding local distribution functions; and calculating, for the characteristic value of each of the Wi-Fi access points, an information gain value according to an average value of the corresponding global distribution function and the corresponding local distribution functions, wherein the information gain value represents an information amount related to space in the plurality of records of collected data related to the Wi-Fi access point.

9. The positioning system according to claim 6, wherein a step that the processor is configured to serve the calculated metadata as the filtering condition related to the identification rate further includes that: the processor is configured to determine whether or not the metadata of the plurality of Wi-Fi access points meet a predetermined condition, and if the predetermined condition is met, the processor is configured to take the characteristic values of the Wi-Fi access points whose metadata meet the predetermined condition out from the plurality of records of fingerprint data to be reorganized as the Wi-Fi fingerprint data with the relatively high identification rate.

10. The positioning system according to claim 6, wherein a step that the processor is configured to train the machine learning model with the extracted Wi-Fi fingerprint data with higher identification rate and the corresponding spatial coordinates further includes:

performing a multi-stage composite pre-processing on the extracted Wi-Fi fingerprint data having the relatively high identification rate, wherein the multi-stage composite pre-processing includes extreme value filtering, normalization, and sample number balancing;

performing standardizing and the sample number balancing for the corresponding spatial coordinates;

dividing the Wi-Fi fingerprint data processed by the multi-stage composite pre-processing and the corresponding spatial coordinates into a training set and a verification set in proportion, and training the machine learning model with the training set; and inputting the verification set into the machine learning model to evaluate whether or not the machine learning model passes a performance test, if not, adjusting a plurality of hyperparameters associated with the machine learning model and continuously training the machine learning model with the training set until the machine learning model passes the performance test, and using the machine learning model that has passed the performance test as the trained machine learning model, wherein the plurality of hyperparameters include learning rates, noise intensities, and correlation coefficients of a gradient optimization model.

* * * * *